(12) United States Patent
Henn

(10) Patent No.: US 6,354,744 B1
(45) Date of Patent: Mar. 12, 2002

(54) BEARINGS, END WASHERS AND SECURING METHOD

(75) Inventor: Andrew Henn, Fairfield, CT (US)

(73) Assignee: Roller Bearing Company of America, Inc., Fairfield, CT (US)

( * ) Notice: Subject to any disclaimer, the term of this patent is extended or adjusted under 35 U.S.C. 154(b) by 0 days.

(21) Appl. No.: 09/516,583

(22) Filed: Mar. 1, 2000

Related U.S. Application Data

(60) Provisional application No. 60/122,183, filed on Mar. 1, 1999.

(51) Int. Cl.$^7$ .................................................. F16C 33/58
(52) U.S. Cl. ........................................ 384/564; 384/569
(58) Field of Search .................................. 384/564, 903, 384/569, 570, 571

(56) References Cited

U.S. PATENT DOCUMENTS 1,803,966 A * 5/1931 Gibbons
2,198,376 A * 4/1940 Cederberg \* cited by examiner Primary Examiner—Lenard A. Footland

(74) Attorney, Agent, or Firm—James Creighton Wray; Meera P. Narasimhan

(57) ABSTRACT

A bearing has an outer ring, an inner ring and rollers between the rings. The inner ring has axial outward extensions with stepped radially outward surfaces receiving the radially outward extending end washers. Inward extending grooves are formed in the axial surfaces of the steps. Inner axially extending surfaces of the end washers have complementary grooves about twice as deep as the grooves in the inner ring ends. To assemble the washer on the inner ring, a C-shaped external retaining ring is expanded into the washer groove, while the washer is slipped over the axially extending surface of the step on the outer end of the internal ring. The external retaining ring slides along the lateral surface of the step until it reaches the groove and springs inward into the groove. Half of the thickness of the external retaining ring fits in the groove. The outer half of the thickness remains in the groove in the inner wall of the washer, firmly locking the washer on the stepped outer end of the inner ring. A tapered end washer installation plug is inserted in an end of the inner ring so that the maximum dimension of the tapered end is adjacent the end of the axially extending surface in the outer end of the inner ring. The tapered surface extends outward and slopes inward. An external retaining ring is partially placed in the groove of an end washer, and the end washer and retaining ring are placed on the tapered surface of the installation plug.

49 Claims, 4 Drawing Sheets

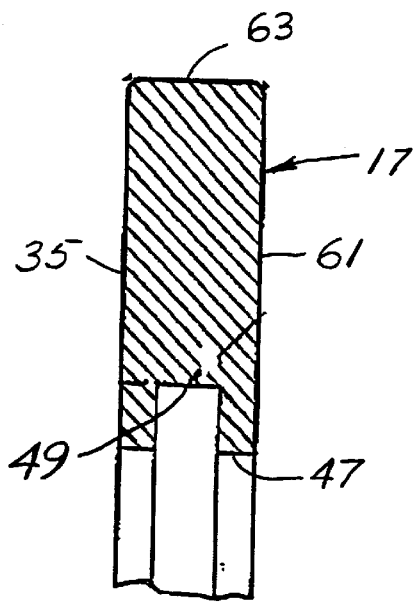
FIG. 5
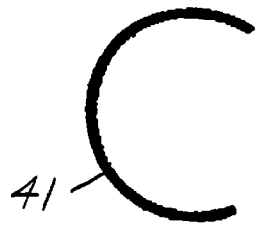
FIG. 6
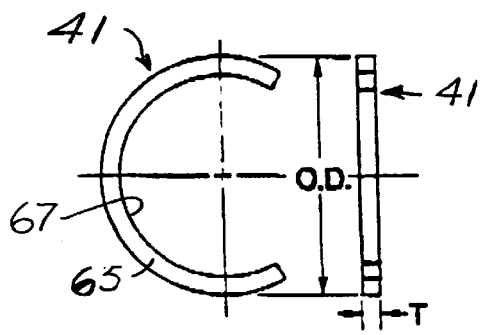
FIG. 7
FIG. 8

BEARINGS, END WASHERS AND SECURING METHOD

This application claims the benefit of U.S. provisional application No. 60/122,183 filed Mar. 1, 1999.

BACKGROUND OP THE INVENTION

The invention relates to bearings, end washers and securing end washers to inner rings of roller bearings.

While there are many ways to provide bearings with end washers, the need remains for securing end-washers with retainers that do not impede the smooth functioning of the bearings assembled on shafts. Prior art roller bearing devices have end washers which are generally retained by press forming the extended ends of the inner ring into a chamfer on the end washer. That method tends to distort the bore size or causes binding of the rollers. Alternatively, a soft split ring is used between the inner rings and the end washer to secure the end washer, which distorts the bore and becomes easily loose. However, needs exist for bearings with end washers easily secured thereon by retaining rings that allow for optimal use of the bearing.

The present invention fulfills that need as described in the ongoing specification.

SUMMARY OF THE INVENTION

The invention is described with reference to bearings, end washers and securing end washers to inner rings of roller bearings. However, the invention is applicable to any bearing in which washers are secured to outer surfaces of the bearings.

In one form of the invention, a bearing has an outer ring, an inner ring and rollers between the rings. The inner ring has axial outward extensions with stepped radially outward surfaces, which receive the radially outward extending end washers. Inward extending grooves are formed in the axial surfaces of the steps. Inner axially extending surfaces of the end washers have complementary grooves about twice as deep as the grooves in the inner ring ends.

To assemble the washer on the inner ring, a C-shaped external retaining ring is expanded into the washer groove, while the washer is slipped over the axially extending surface of the step on the outer end of the internal ring. The external retaining ring slides along the lateral surface of the step until it reaches the groove and springs inward into the groove. Half of the thickness of the external retaining ring fits in the groove. The outer half of the thickness remains in the groove in the inner wall of the washer, firmly locking the washer on the stepped outer end of the inner ring.

Preferably the external retaining ring has a rectangular cross-section, usually a square cross-section, with a width that is slightly less than widths of the grooves, and with a radial height which is about twice the depth of the groove in the inner ring and slightly less than the depth of the groove in the central surface of the washer. The external retaining rings are made of spring steel and preferably have an inner diameter commensurate with the inner diameter of the groove on the extended end of the inner ring.

A tapered end washer installation plug is inserted in an end of the inner ring so that the maximum dimension of the tapered end is adjacent the end of the axially extending surface in the outer end of the inner ring. The tapered surface extends outward and slopes inward. An external retaining ring is partially placed in the groove of an end washer, and the end washer and retaining ring are placed on the tapered surface of the installation plug. Pushing the washer axially toward the inner ring expands the retaining ring until it is fully within the groove in the central surface of the washer. Continually pushing the washer toward the inner ring transfers, end washer and the retaining ring from the tapered wall of the installation plug to the axial surface of the stepped end of the inner ring. Pushing the washer to its home position against the radial wall of the step aligns the retaining ring with the groove in the axially extending wall of the step. The retaining ring springs into the groove, leaving part of the retaining ring in the washer groove and holding the washer firmly.

Usually two end washers are so installed on extended ends of an inner ring. Washers may be installed on any types of bearings, including a needle roller bearing. In the needle roller bearing installation the washers hold the outer rings in place and also retain the rollers. Outer ends of the washers fit within seals installed in recesses in the axial faces of the outer rings. The annular seals are preferably made of, but not limited to, acetal resin, nylon, hytrel or any other suitable material. The seals have an annular rim which fits between a radially extending inner surface of the washer and a radially extending surface in the outer ring recess. An outer flange of the seal fits between the axially extending outer surface of the washer and an axial surface of the recess. A sloped lip extends radially and axially outward from an inner end of the seal flange to fit tightly within the recess. The washers hold the outer rings in place, and also trap needle rollers between the outer surface of the inner ring and the inner surface of the outer ring. The outer ring, inner ring and end washers are preferably made of steel, and the seal is made of acetal resin or other suitable material. The bearing is prepacked with grease and allows rolling of the inner ring with respect to the outer ring, such as when a shaft is positioned in the inner ring.

The outer surface of the outer ring has a crown radius to allow turning of the outer ring in a seat for maintaining bearing and shaft alignment.

The invention is used for securing end washers to any bearing, and is not limited to roller bearings.

These and further and other objects and features of the invention are apparent in the disclosure, which includes the above and ongoing written specification, with the claims and the drawings.

BRIEF DESCRIPTION OF THE DRAWINGS

FIG. 5 is a cross-sectional detail of an end washer showing an internal groove to accept a retaining ring.

FIG. 6 is a side elevation of a retaining ring.

FIGS. 7 and 8 are side and end elevations of a retaining ring.

DETAILED DESCRIPTION OF THE PREFERRED EMBODIMENTS

Figure 1:
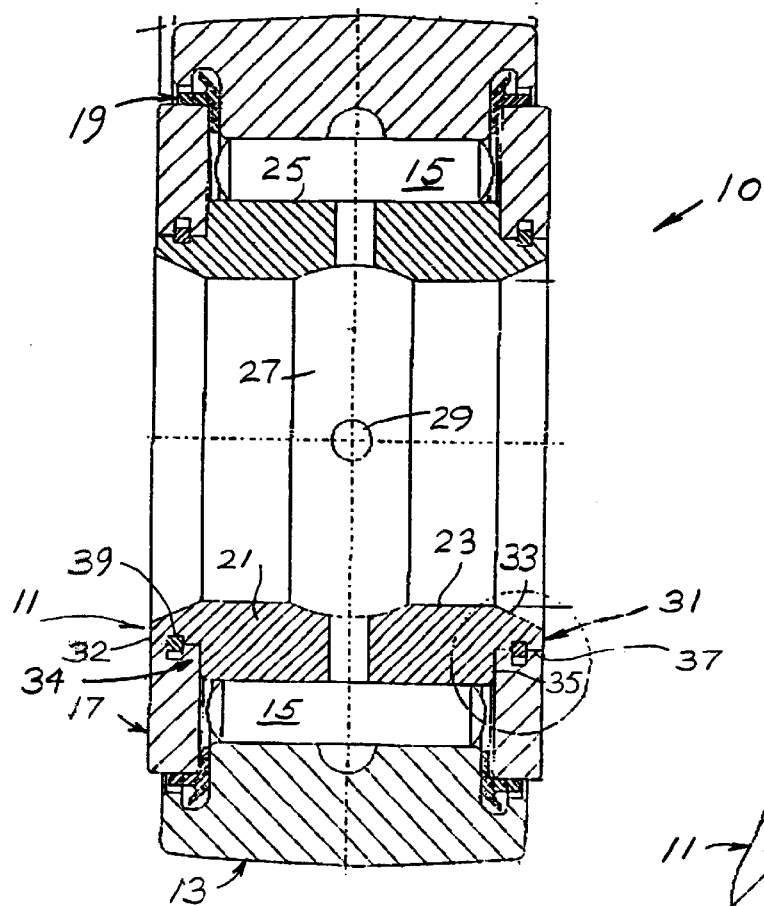
FIG. 1 is a cross-sectional view of an assembled roller bearing with end washers held in place according to the present invention.

A roller bearing is generally indicated by the numeral 10. The bearing has an inner ring 11, an outer ring 13, and rollers 15 positioned between the inner and outer rings. End washers 17 are connected to the inner ring and hold the inner ring and outer ring in alignment, and also hold the rollers 15. A seal 19 is positioned between inward facing walls of the end washer 17 and outward facing walls of recesses in the outer ring.

The inner ring has a main body 21 with a central bore 23 and an outer race surface 25, on which the rollers 15 roll. A central radius recess 27 has four lubricating holes 29, which supply lubrication to the roller bearings. Outward extensions 31 of the inner ring 11 have tapered inner surfaces 33 and outer steps 34, with radial walls 35 and axially extending walls 37. Recesses formed in the axially extending walls 37 receive retaining rings 41. Recesses 39 have approximately half of the axial dimension of the rectangular, preferably square retaining rings 41. The end washers 17 have retaining ring-receiving recesses 43, and inward facing walls 45 which fit in steps 44 against the walls 35 of the inner rings. An inner surface 47 of each washer 17 fits within the axially extending surface 37 of the inner ring step. The retaining ring-receiving groove 43 in the inner axially extending surface 47 of the washer 17 is sufficiently deep to receive the entire retaining ring.

Rollers 15 have rounded ends 51, which are spaced from the inner surfaces 45 of the end washers. Outer rings 13 have inner surfaces 53 on which the rollers 15 roll. A semicircular groove 54 extends around the inner surface 53 to assist in lubricating the rollers 15.

An outer surface 55 of the outer ring has a radius for providing self-aligning features of the roller bearing. A recess 56 in each end of the outer ring has an axial wall 57, an inner circular cavity 58 and a radial wall 59 to assist in location of the seal 19, as will be described later.

Figure 3:
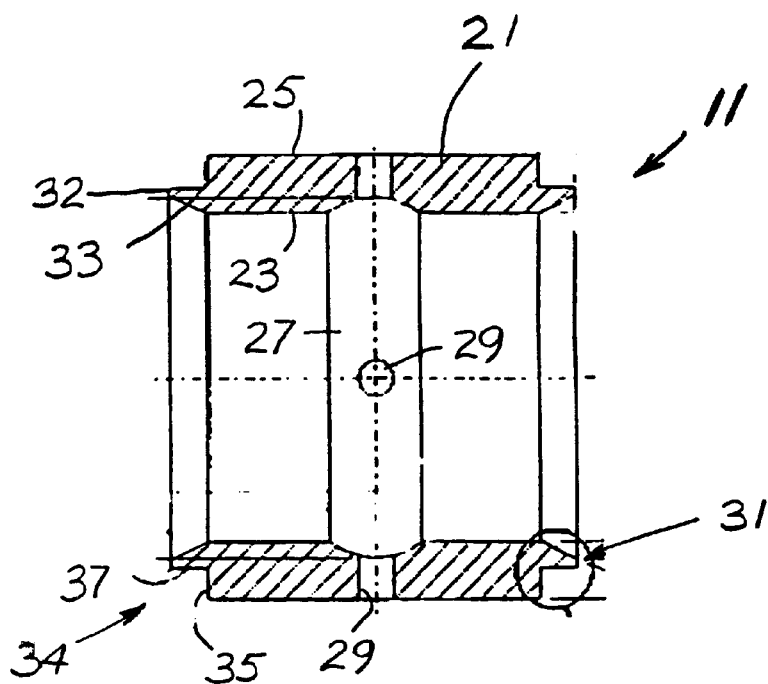
FIG. 3 is a detail of construction of the inner ring.
Figure 4:
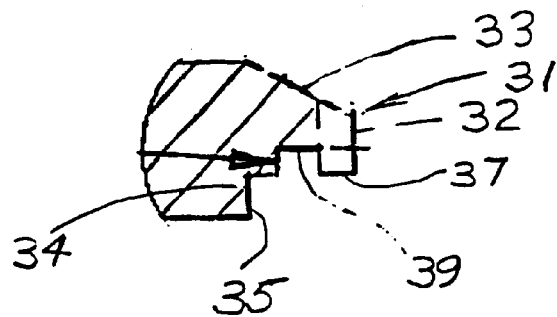
FIG. 4 is a detail of an extended end of the inner ring showing the washer-receiving step and the retaining ring groove.

The inner ring 11 before the forming of the retaining ring groove is shown in greater detail in FIG. 3. There the body 21 with the inner bore 23 and the outer cylindrical surface 25 are clearly seen. The central radiused groove 27 and the four lubricating openings 29 are shown. The inner ring has extended ends 31 with flat outer walls 32, tapered inner surfaces 33 and annular steps 34, formed by radial walls 35 and axially extending walls 37. As shown in FIG. 4, shallow retaining ring-receiving grooves 39 are formed in walls 37 of the extensions 31.

Figure 2:
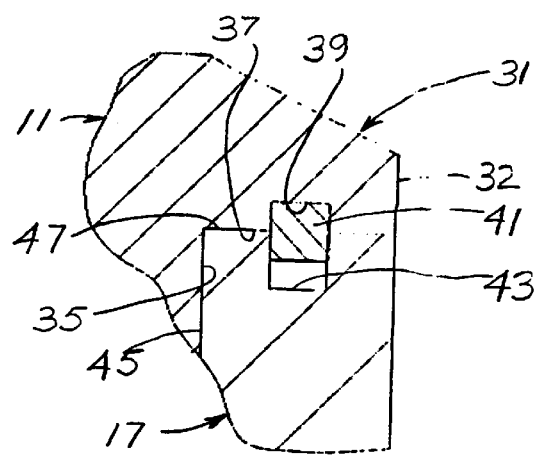
FIG. 2 is a detail of the end washer securing structure shown in FIG. 1.

Annular end washers 17 are shown in greater detail in FIG. 5. The annular washers 17 have inward faces 35 and inner surfaces 47 in which internal grooves 49 are formed to accept a retaining rings 41, as shown in FIG. 2. Radially extending outer faces 61 and axially extending outer cylindrical surfaces 63 are formed on the steel end washers 17.

A C-shaped external retaining ring 41 is generally shown in FIG. 6, and more particularly in the details of FIGS. 7 and 8. The side walls 65 fit within the side walls of the grooves 39 and 43 in the inner ring and end washers respectively. The external retaining rings 41 have thickness T slightly less than the widths of the corresponding grooves. Inner circumference 67 rests on the bottom of groove 39 when the end washers and external retaining rings are joined on the inner rings. The vertical dimension of the cross-section is slightly less than the corresponding vertical dimension of the recess 43 and the end washer, and about twice the depth of the recess 39 in the inner ring.

Figure 9:
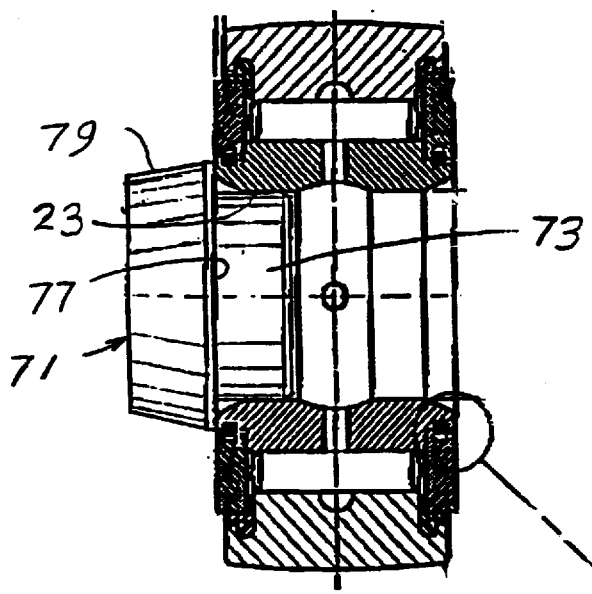
FIG. 9 shows a tapered end washer installation plug in an inner ring.

A tapered installation plug 71 shown in FIG. 9 is used to mount the end washer and spring steel retaining ring on the extended end of the inner ring. A cylindrical extension 73 is inserted in one end of the axial bore 23 of the inner ring. A large inner end 75 of the installation plug aligns axially with axially extending wall 37. The inward facing wall 77 abuts the outward facing wall 32 of the inner ring extension 31. Tapered side wall 79 expands the retaining ring 41 into the recess 43 of the end washer 17 while the end washer 17 and retaining ring 43 are pushed inward toward the inner ring. The large end 75 of the installation plug transfers the expanded ring 43 and the washer 17 onto the surface 37 of the outer extension 31.

Figure 10:
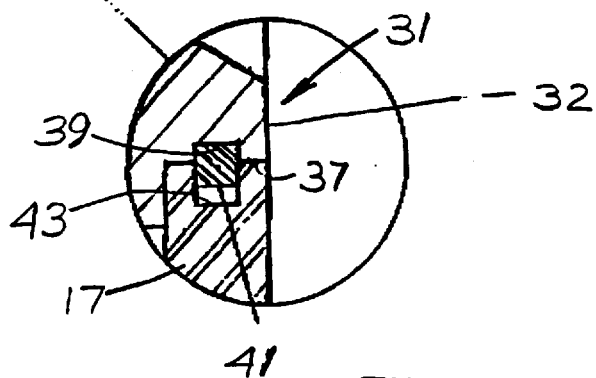
FIG. 10 is a detail of the retaining ring installation.

As the ring 41 aligns with groove 39, ring 41 springs partially into the groove 39, leaving part of the ring in the washer groove 43 to hold washer 17 on the inner ring, as shown in FIG. 10.

Figure 11:
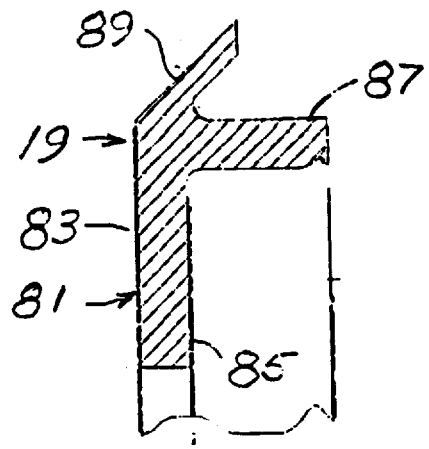
FIG. 11 is a cross-sectional detail of a seal ring.

FIG. 11 is a detail of the annular seal 19 which is made of acetal resin or other suitable material. Seal 19 has a radially extending wall 81 with an interface 83, which is located adjacent the surface 59 of the outer ring. An outward face 85 locates against an inner face 45 of the end seal 17. An outer flange 87 of the seal 19 is positioned between the outer wall 63 of the end washer and the inner wall 57 of the recess 56. A flexible extension 89 fits within the cavity 58 in the outer ring and holds the seal in place while the elements are being assembled.

Figure 12:
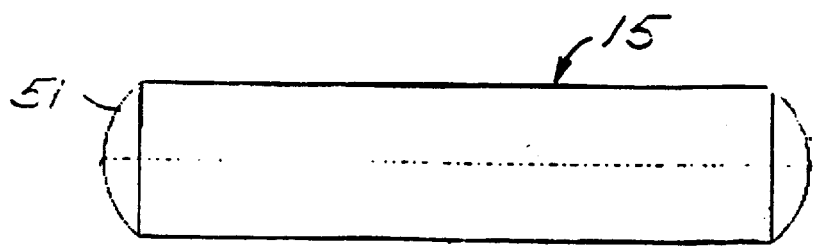
FIG. 12 is a detail of a roller.

A roller 15 is generally shown in FIG. 12. The roller has cylindrical outer surface and radiused end surfaces 51.

While the end washer mounting of the present invention is particularly useful in roller bearings, and it is useful in any bearing where an end washer is mounted on a bearing.

While the invention has been described with reference to specific embodiments, modifications and variations of the invention may be constructed without departing from the scope of the invention, which is defined in the following claims.

I claim:

1. A bearing apparatus comprising an inner ring, an outer ring, rollers positioned between the inner and outer rings, and end washers connected to the bearing for holding the inner ring and outer ring in alignment and for holding the rollers, further comprising a central radius recess, and four lubricating holes in the recess for supplying lubrication to the bearings.

2. The apparatus of claim 1, further comprising outward extensions on the inner ring, tapered inner surfaces and outer steps on the extensions with radial walls and axially extending walls.

3. A bearing apparatus comprising an inner ring, an outer ring, rollers positioned between the inner and outer rings, and end washers connected to the bearing for holding the inner ring and outer ring in alignment and for holding the rollers, further comprising outward extensions on the inner ring, tapered inner surfaces and outer steps on the extensions with radial walls and axially extending walls, recesses formed in the axially extending walls and retaining rings receivable in the recesses.

4. The apparatus of claim 3, wherein the inner ring comprises a main body, a central bore in the main body and an outer race surface on which the rollers roll.

5. The apparatus of claim 3, further comprising retaining rings and recesses on the end washers for receiving the retaining rings.

6. The apparatus of claim 3, further comprising inward facing walls on the end washers, steps and walls on the inner rings complementary to the inward facing walls for fitting the end washers against the inner ring.

7. The apparatus of claim 3, wherein the recesses have about half of an axial dimension of the retaining rings.

8. The apparatus of claim 7, wherein the retaining rings have a quadrilateral shape.

9. The apparatus of claim 8, wherein the shape is square.

10. The apparatus of claim 8, wherein the shape is rectangular.

11. The apparatus of claim 3, wherein an inner surface of each end washer fits within an axially extending surface of a step of the inner ring.

12. The apparatus of claim 11, wherein the step is annular and formed by radial walls and axially extending walls of the inner ring.

13. A bearing apparatus comprising an inner ring, an outer ring, rollers positioned between the inner and outer rings, and end washers connected to the bearing for holding the inner ring and outer ring in alignment and for holding the rollers, wherein an inner surface of each end washer fits within an axially extending surface of a step of the inner ring, and wherein the step is annular and formed by radial walls and axially extending walls of the inner ring, further comprising shallow retaining ring-receiving grooves in walls of extensions on the inner ring.

14. The apparatus of claim 13, wherein the outer rings have inner surfaces for receiving the rollers.

15. The apparatus of claim 14, further comprising a semicircular groove extending around the inner surfaces to assist in lubricating the rollers.

16. The apparatus of claim 13, wherein the recesses are provided in inner axially extending surfaces of the end washers.

17. The apparatus of claim 13, wherein depths of the recesses are sufficient to receive entire retaining rings.

18. The apparatus of claim 13, further comprising a seal positioned between inward facing walls of the end washers and outward facing walls of recesses in the outer ring.

19. The apparatus of claim 13, wherein the rollers have rounded ends spaced from inner surfaces of the end washers.

20. The apparatus of claim 13, wherein the outer rings have outer surfaces having a radius.

21. A bearing apparatus comprising an inner ring, an outer ring, rollers positioned between the inner and outer rings, and end washers connected to the bearing for holding the inner ring and outer ring in alignment and for holding the rollers, wherein the outer ring has ends, a recess in each end having an axial wall, an inner circular cavity and a radial wall, and seals locatable in the recess.

22. The apparatus of claim 21, wherein the end washers are annular.

23. The apparatus of claim 21, wherein the end washers are steel washers.

24. The apparatus of claim 21, wherein the end washers comprise inward faces, inner surfaces, internal grooves in the inner surfaces, radially extending outer faces and axially extending outer cylindrical surfaces.

25. The apparatus of claim 24, further comprising retaining rings receivable in the internal grooves.

26. The apparatus of claim 25, wherein a vertical dimension of a cross-section of the retaining rings is slightly less than a corresponding vertical dimension of the recess and the end washer and about twice a depth of the recess in the inner ring.

27. The apparatus of claim 25, wherein inner circumferences of the retaining rings rest on bottoms of the grooves when the end washers and retaining rings are joined on the inner rings.

28. The apparatus of claim 25, wherein the retaining rings are C-shaped.

29. The apparatus of claim 25, wherein side walls of the retaining rings fit within side walls of the grooves in the inner ring and in end washers respectively.

30. The apparatus of claim 29, wherein the retaining rings have a thickness slightly less than widths of corresponding grooves.

31. A bearing apparatus comprising an inner ring, an outer ring, rollers positioned between the inner and outer rings, and end washers connected to the bearing for holding the inner ring and outer ring in alignment and for holding the rollers, wherein the end washers comprise inward faces, inner surfaces, internal grooves in the inner surfaces, radially extending outer faces and axially extending outer cylindrical surfaces, further comprising retaining rings receivable in the internal grooves, further comprising a tapered installation plug for mounting the end washer and the retaining ring on an extended end of the inner ring.

32. The apparatus of claim 31, further comprising a cylindrical extension in one end of an axial bore of the inner ring.

33. The apparatus of claim 31, wherein the retaining rings are spring steel rings.

34. The apparatus of claim 31, further comprising an inner enlarged end of the installation plug aligned axially with axially extending walls of the inner ring.

35. The apparatus of claim 34, further comprising an inward facing wall abutting an outward facing wall of an extension of the inner ring, and tapered side walls for expanding the retaining ring into the recess of the end washer when the end washer and retaining ring are pushed inward toward the inner ring.

36. The apparatus of claim 35, wherein the enlarged end of the installation plug transfers the expanded retaining ring and the end washer onto a surface of the extension.

37. The apparatus of claim 36, wherein the ring partially springs into the groove during alignment leaving part of the ring in the end washer for holding the washer on the inner ring.

38. A bearing apparatus comprising an inner ring, an outer ring, rollers positioned between the inner and outer rings, and end washers connected to the bearing for holding the inner ring and outer ring in alignment and for holding the rollers, further comprising a seal positioned between inward facing walls of the end washers and outward facing walls of recesses in the outer ring, wherein the seals are annular.

39. The apparatus of claim 38, wherein the outer ring has an outer surface with a crown radius to allow turning of the outer ring in a seat for maintaining bearing and shaft alignment.

40. The apparatus of claim 38, further comprising grease prepacking to allow rolling of the inner ring with respect to the outer ring when a shaft is positioned in the inner ring.

41. The apparatus of claim 38, wherein the seals are made of a material selected from the group consisting of nylon, hytrel and acetal resin.

42. The apparatus of claim 38, wherein each seal has a radially extending wall with an interface located adjacent a surface of the outer ring.

43. The apparatus of claim 42, further comprising an outward face on the seal located against an inner face of the end washer.

44. The apparatus of claim 42, further comprising an outer flange of the seal positioned between an outer wall of the end washer and an inner wall of the recess.

45. The apparatus of claim 44, further comprising a flexible extension within the cavity in the outer ring for holding the seal in place during assembly.

46. The apparatus of claim 38, wherein the rollers have cylindrical outer surface and radiused end surfaces.

47. The apparatus of claim 38, wherein the bearing is a roller bearing.

48. The apparatus of claim 47, wherein the bearing is a needle roller bearing.

49. The apparatus of claim 38, wherein the outer and inner rings and end washers are of steel material.

* * * * *